United States Patent Office 3,090,823
Patented May 21, 1963

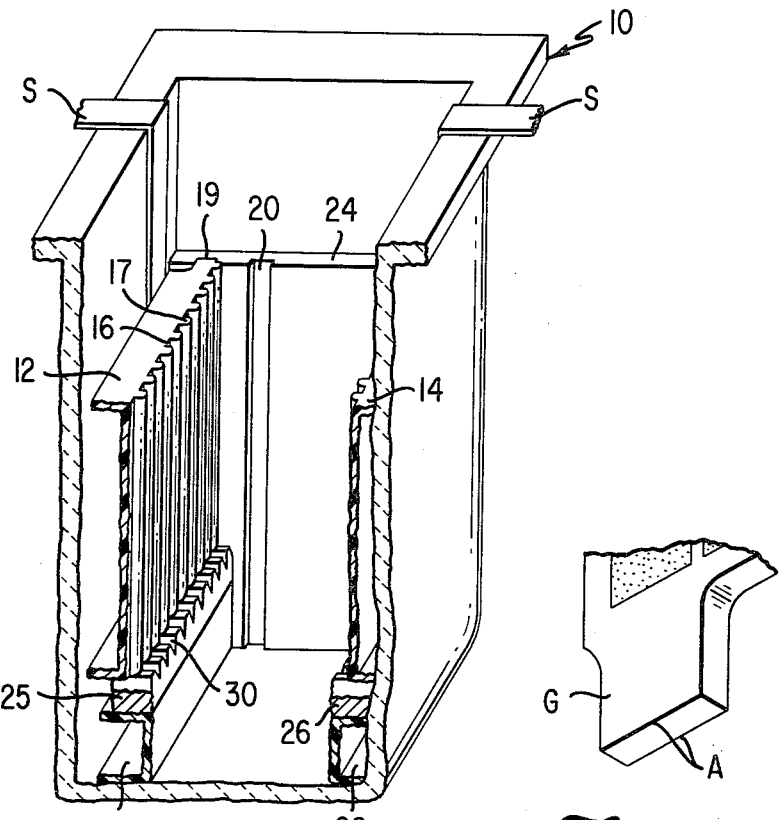
*Fig. 1*
*Fig. 2*
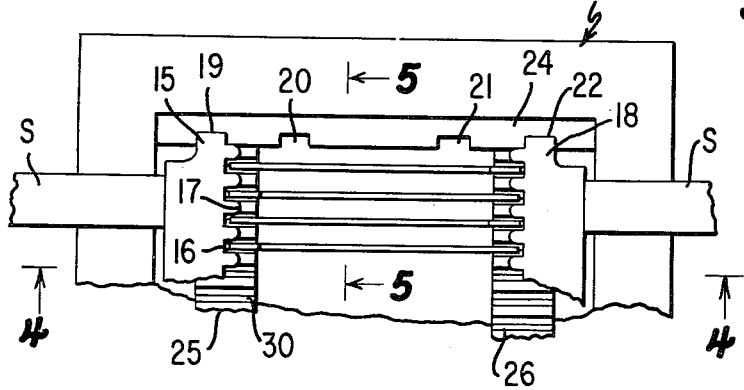
*Fig. 3*
INVENTOR.
ANTHONY ROACH
BY
Falvey, Souther & Stoltenberg
ATTORNEYS May 21, 1963 A. ROACH 3,090,823
TANK FOR FORMING BATTERY ELEMENTS
Filed Sept. 25, 1959 3 Sheets-Sheet 2
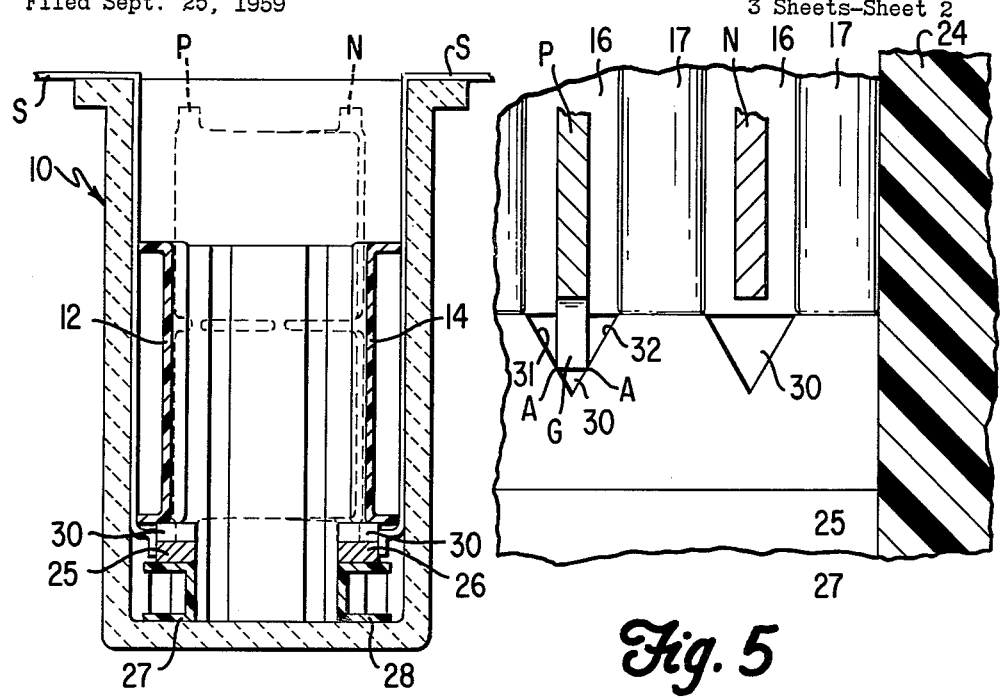
Fig. 4   Fig. 5
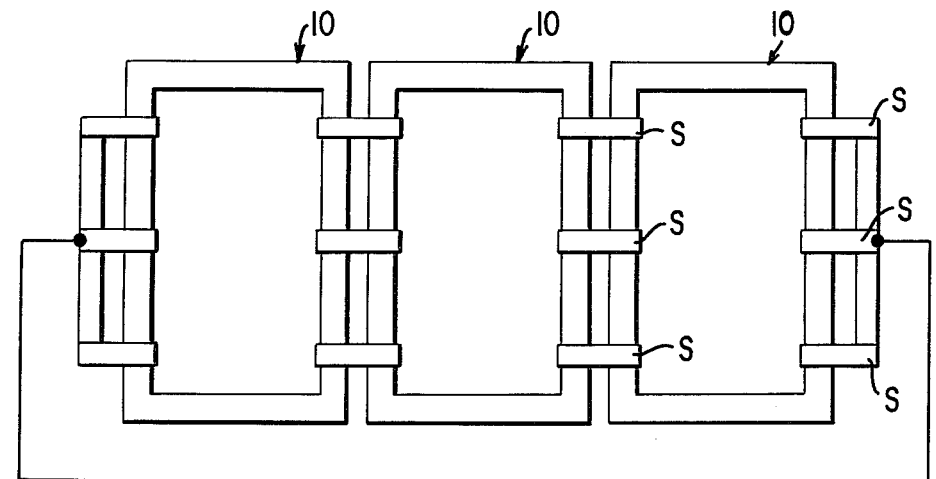
Fig. 6
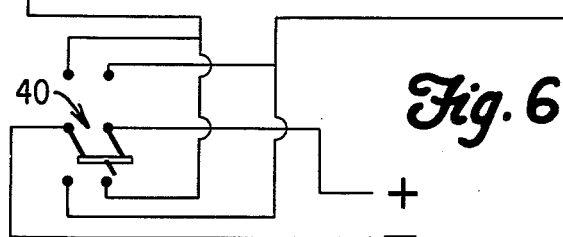
INVENTOR.
ANTHONY ROACH
BY
Falvey, Souther & Stoltenberg
ATTORNEYS

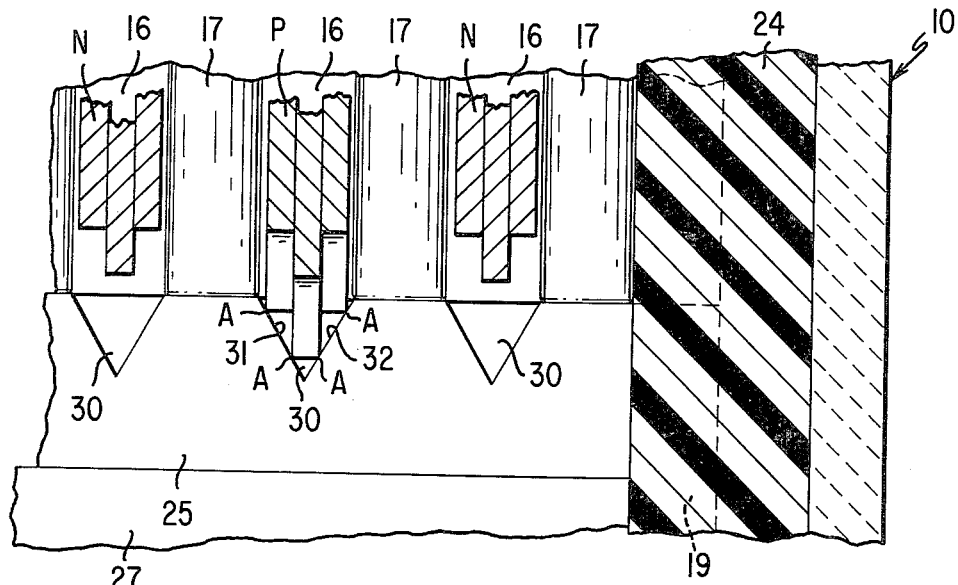
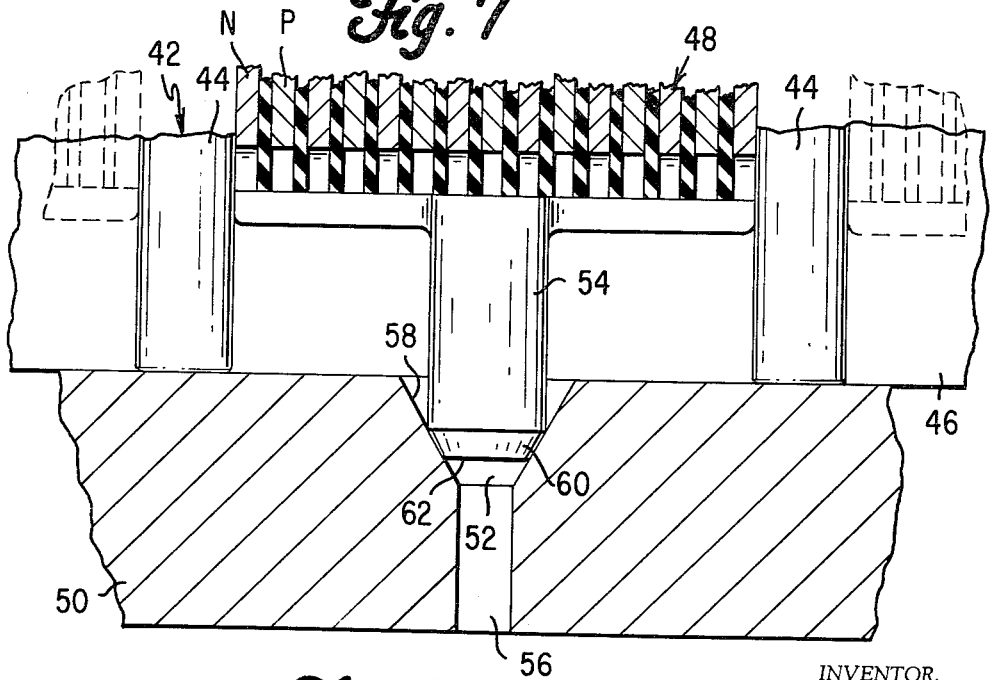
INVENTOR.
ANTHONY ROACH

3,090,823
TANK FOR FORMING BATTERY ELEMENTS
Anthony Roach, Oakland, Calif., assignor, by mesne assignments, to Ford Motor Company, a corporation of Delaware
Filed Sept. 25, 1959, Ser. No. 842,261
4 Claims. (Cl. 136—82)

This invention relates to a system for forming battery plates, and more particularly to a tank and its related elements for forming lead acid positive and negative storage battery plates.

This invention contemplates a forming tank provided with a new and improved current conducting arrangement to insure a positive electrical connection between the lugs of battery plates and a common bus bar or contact member submerged in the electrolyte near the bottom of the forming tank.

Heretofore, it has been the practice to use a wedging effect for connecting to a contact bar which comprised a submerged metal member provided with an inwardly inclined surface extending longitudinally along one of its edges on which the lugs of the plates rested by gravity to form a means to conduct current to the battery plates in the forming process. The inwardly inclined surface provides a wedging action at the corner point of a post for electrical contact between the bar and the plate post so that the contact area is limited to the thickness of a plate. This arrangement has proven unsatisfactory mainly because the thickness of a plate is inherently restricted, and, therefore, a minimum of contact area is provided thereby to conduct current to the battery plates.

As is well known in battery manufacturing, a peroxidation contamination takes place during positive plate forming, causing a considerable problem, particularly in the contact area for the positive plates. During the forming process, a positive plate requires a more definite or positive means of conducting current to the plate than a negative plate. Past experience has shown that when forming a positive plate, granular deposit will gather around the point of contact between the plate post or lug and the conducting means submerged in the tank, to the extent that eventually the flow of current will be completely cut off from the battery plate. This peroxidation process, after a period of time, will develop an insulating layer on the entire surface of conducting elements in the tank resulting in an unsatisfactory contact being made with subsequent plates to be formed. A considerable amount of manufacturing time is wasted when a forming operation is shut down because the contact surfaces involved are in need of cleaning.

A principal object of this invention is to provide a forming tank for a battery manufacturing process having a new and improved arrangement of contact elements, including a new method of wedging contacts to reduce electrical resistance during a forming process.

Another object of the invention is to provide a forming tank having an arrangement of contact elements which may be adjusted within the tank so as to be adaptable to battery plates of various sizes, thereby eliminating the need of a large number of interchangeable tank elements to fit plates of the various sizes.

Another object of the invention is to provide a conducting contact bar extending longitudinally of the forming tank provided with a plurality of transverse V grooves in which the posts of the plates are adapted to rest by gravity to make contact to conduct current to the battery plates during the forming process, both the conducting contact bar and the plate with its contacting portion being submerged in the electrolyte in the forming tank.

Another object of the invention is to provide a means for forming battery plates wherein a greater contact area is provided by taking advantage of the width of a plate post, rather than its thickness as has been done in the past when using a contact bar with an inclined surface, thereby providing at least ten times more contact area on an average post.

Another object of the invention is to provide a means for forming battery plates wherein both terminal edges of both faces of a plate post provide the electrical contact surface, the contact area depending on the width of the plate post.

Another object of the invention is to provide a forming tank having identical contact bars for both positive and negative plates making it possible to reverse the polarity of the electrical circuit each time a group of plates is formed (i.e., the positive contact bar in the previous operation becomes the negative contact bar in the next operation) in order that the positive plates, which require the most efficient contact, are always dropped on a bar which is free of lead peroxide and/or lead sulphate created by a self-cleansing action brought about by the reversal of current flow.

Another object of the invention is to provide a battery forming means which is maintenance free and in all respects more efficient and more economical than forming means used in the past in the manufacturing of electric storage batteries.

Referring to the drawings:

FIG. 1 is an isometric sectional view through a forming tank showing the tank elements;

FIG. 2 is an isometric view showing the bottom of a battery plate post;

FIG. 3 is a portion of a top plan view of one end of the forming tank;

FIG. 4 is a sectional view taken on line 4—4 of FIG. 3;

FIG. 5 is an enlarged sectional view showing a positive and a negative plate in position taken on line 5—5 of FIG. 3;

FIG. 6 shows diagrammatically a plurality of tanks and the electrical circuit for same;

FIG. 7 is a view similar to FIG. 5 showing a plurality of plates in a single space; and FIG. 8 shows a complete battery cell element being formed in a tank having similar tank elements.

Referring to the drawings, and particularly to FIG. 1, a portion of an open top rectangularly-shaped forming tank 10 is shown. The inner surfaces and top edge of the entire tank are of acid-resistant insulating material such as ceramic or plastic having high dielectric strength. The preferred arrangement, as shown, is to fabricate the entire tank of one material in a monolithic construction.

The tank 10 is designed to be of universal use in a mass production line in that the cooperating parts within the tank may be moved to various locations to accommodate various plates for the different battery sizes thereby eliminating the need of numerous tanks or tank components.

The cooperating parts within the tank include two identical channel-shaped side wall adapter members 12 and 14, preferably molded from acid-resistant resin material, which are each provided with integral end projections 15 and 18, respectively (FIG. 3), which slidingly fit in vertical grooves 19, 20, 21 and 22 provided in two identical end wall adapter members 24 which are also made of acid-resistant plastic material. Only one of the end wall adapter members is shown in the drawings, but the interlocking relation of the parts is clearly shown to hold them in position in the tank 10. The side wall adapter members 12 and 14 rest on two identical current-conducting lead alloy contact bars 25 and 26 which are removably positioned on one side of two channel-shaped support members 27 and 28 also made from acid-resistant resin material. The support members 27 and 28 rest on the bottom of the tank 10 and are removable.

All of the parts described, which are positioned on opposite sides of the tank 10, are identical in configuration, and are, therefore, interchangeable within said tank. This advantage reduces the cost of producing the tank elements and, also, there is no possibility of an operator making an error when placing the elements in the tank since they will fit on either side.

Connected to the contact bars 25 and 26 are a plurality of current-conducting straps S which are positioned in a clearance (FIG. 4) provided between the tank wall and the horizontal flanges of the side wall adapter members 12 and 14. These straps are made of lead or lead alloy, being permanently connected to the contact bars 25 and 26 to supply the forming tank with positive and negative current.

By providing a plurality of spaced vertical grooves 19, 20, 21 and 22 in the end wall adapter members 24 (FIGS. 1 and 3), having a sliding engagement with the end wall adapter members 12 and 14, a width adjustment between the side wall adapter members 12 and 14 can easily be made to accommodate different size plates. Whenever the side wall adapter members 12 and 14 are relocated, the cooperating connector bars 25 and 26 and their support members 27 and 28 are also moved correspondingly, which is possible since they are not permanently attached to the bottom of the tank 10.

Since the members on opposite sides of the tank 10 are identical, only one side group will be explained in detail. Referring particularly to side wall adapter member 12 and its cooperating parts, as seen in FIGS. 1, 3, and 4, a guide or holding means is provided consisting of spaced vertical ridges or projections 17 integral with the main channel member to guide battery plates P and N to the submerged current-conducting contact bar 25 by holding the plates in a substantially vertical position in the guides or slots 16. The projections 17 are necessary to hold the positive and negative plates in spaced relation during a forming operation. The slots or guides 16 are directly above recesses or V-notches 30 provided in the upper surface of the current-conducting bar 25, which also assist to maintain the plates in a substantially uniformly-spaced vertical position during a forming operation. As can be seen in the drawings, a V-notch or recess 30 is provided in contact bar 25 for each slot 16, the significance of which will be apparent hereinafter.

Referring to FIG. 5, the V-shaped recesses or notches provide the means of making contact with the plates for conducting electrical current to both positive and negative plates, as the case may be, when the converging walls 31 and 32 of a recess engage edges A (FIG. 2) of a battery plate post G. When battery plates are inserted in slot 16 and allowed to drop down as far as possible, the converging walls 31 and 32 of the V-recesses 30 have a wedging effect on both edges A of the plate post G, the pressure being applied to the edges by the weight of the double plate, thereby providing an efficient electrical contact.

As pointed out above, during a forming operation, a peroxidation reaction taken place wherein a deposit of lead peroxide and/or lead sulphate accumulates on the bars 25 and 26 at the point of electrical contact and to a greater degree at the point of contact of the positive plates. This accumulation of minute crystals eventually forms an electrical insulating layer which sometimes builds up to the point where electrical contact is broken so that some plates are not formed.

The fact that the side wall adapter members 12 and 14 are identical in configuration as are the contact bars 25 and 26, either contact bar 25 and 26 can be made of positive or negative polarity when desired. The reversing of the current flow in the forming tank by reversing the polarity of the bars causes the objectionable deposits due to peroxidation to be dissolved from the current-conducting elements. The arrangement of tank elements makes it possible to reverse the polarity of the bars each time a group of plates is formed, i.e. the positive bar in the first forming operation becomes the negative bar in the subsequent operation. This provides a means of freeing the contact surfaces of lead peroxide and/or lead sulphate accumulated during a preceding forming operation, thereby providing clean contact surfaces for the next operation. A contact surface is used in the electrical circuit one time and is clear (FIG. 5) and subject to being cleaned the following time. This is a particular advantage with the positive plates which require the most efficient electrical contact in that they are always dropped on contact surfaces which were cleaned by chemical action in the previous forming operation.

FIG. 6 shows schematically the method of connecting a plurality of forming tanks 10 in series by a plurality of parallel current-conducting straps S. There is a definite voltage drop in each tank so that the number of tanks in the electrical circuit varies with the bus voltage which is available. The circuit includes any suitable type reversible switch such as the double pole, double throw switch 40 or any other method may be used wherein a source of D.C. power may be reversed each time a group of plates is formed.

A forming tank having an arrangement of elements such as shown in FIG. 5 is capable of being used with not only one plate per slot but several simultaneously in each. Referring particularly to FIG. 7, the spaces 16 in the side wall adapter members 12 and 14 and the V-shaped recesses or notches 30 in the contact bars 25 and 26, may be dimensioned to accommodate any number of plates desired. In actual practice, it has been found that a slot large enough for at least three plates, as shown in the drawing, is practical and, at the same time, maintains an effective contact for the forming process. The number of plates that can be formed in this manner is not to be limited and is determined only by the thickness of the individual plates. In battery manufacturing, there is no standard provided for plate thickness, therefore, numerous thicknesses are used, depending on the type of battery to be manufactured.

With reference to the electrical contact areas, an arrangement wherein several plates are placed in the V-shaped recesses 30, the same advantages are provided as when using only one plate inasmuch as both sides of the plate post are used to conduct current to the plate. Referring to FIG. 7, when the plates are dropped in a group in slots 16, they will assume substantially the same stairstep positions in the recesses 30 as shown. Every plate has at least one of its edges A of the plate post in direct contact with the oblique surface of a notch in contact bar 25 while the other side of the same post is in surface to surface contact with, and collecting current from, an adjacent plate post which is also in contact with bar 25. With this arrangement, there is definite assurance that each group of positive and each group of negative plates will have the necessary electrical contact with the bars to accomplish formation of the individual plates. A similar stairstep arrangement of plate posts would be assumed if a larger number of plates were placed in each V-shaped recess, providing the same contact areas as described.

A brief description of the method of preparing a tank for the forming process is as follows: Assuming that all the individual cooperating tank elements are in their adjusted positions to fit the plate size, a group of double plates are lined up in the slots 16 of the side wall adapter members, then released and allowed to fall into the V-shaped recesses 30 in the contact bars. The plates are oriented so that the posts of the positive plates fall on a positive contact bar and the posts of the negative plates fall on a negative contact bar. For all practical purposes, the number of plates in each slot 16 will range from one to four, depending on the plate thickness.

After all tanks in the electrical circuit have been loaded with plates, the acid level in the tanks is adjusted to completely cover the plates. The specific gravity of the acid is adjusted so that upon completion of forming, it will be 1.060±0.010 corrected to 80° F. The charging circuits are closed with the currents ranging from approximately 130 amps to 600 amps with a time cycle of 16 hours. After forming is completed, plates are removed from the tanks and washed and dried in the normal manner preparatory for the next operation in building a storage battery.

An alternate method of forming battery plates using a similar arrangement of tank elements is shown in FIG. 8, whereby an entire battery cell element is processed. Specially made side wall adapter members 42 are used having integral guiding and separating projections 44 providing therebetween spaces 46 to hold therein an entire cell element 48 in a vertical position. A special current-conducting contact bar 50 is also provided having a plurality of cone-shaped cavities 52 located to align and cooperate with a cell post 54 of a cell element 48.

The cone-shaped cavities 52 terminate in a vertical aperture 56 running completely through the contact bar 50. The aperture 56 provides a space for disposal of objectionable dirt and chemical deposits that would normally accumulate in the bottom of cavities 52 to fall free from the cone-contacting surface 58, which provides the electrical-conducting contact surface conducting current to the cell element through an annular conical surface 60 provided on the terminating end 62 of the cell element post 54. The conical surface in cavity 52 provides a similar wedging effect as when using V-shaped recesses for individual plates described hereinbefore.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. An apparatus for forming storage battery plates comprising a tank, means within the tank for supporting battery plates in a substantially vertical position, and at least two substantially identical contact bars within the tank for conducting electrical current to storage battery plates, said contact bars having upwardly diverging sloping notches formed of electrically conductive material and arranged to contact and support battery plates and a plurality of battery plates adapted to be placed in said tank and supported by said contact bars and said means for supporting battery plates in a substantially vertical position, said battery plates each having at least two integral tabs at their lower extremities for making electrical contact with said sloping notches of said identical contact bars.

2. An apparatus for forming storage battery plates comprising a tank, means within the tank for supporting battery plates in a substantially vertical position and a pair of substantially identical contact bars within the tank for conducting electrical current to storage battery plates, said contact bars having upwardly diverging sloping notches formed of electrically conductive material and arranged to directly contact and support battery plates and a plurality of battery plates adapted to be placed in said tank and supported by said contact bars and said means for supporting battery plates in a substantially vertical position, said battery plates each having at least two integral tabs at their lower extremities for making electrical contact with said sloping notches of said identical contact bars, said tabs shaped to make a wedging surface contact with said sloping notches, said apparatus being further provided with a periodically reversible source of electrical energy, said apparatus in circuit with said pair of contact bars.

3. An apparatus for forming storage battery plates comprising a tank, said tank having two end walls and two side walls, said end walls having a plurality of guide means; a pair of substantially identical contact bars within the tank for conducting an electric current to the storage battery plates, said contact bars having diverging, sloping notches formed of electrically conductive material and arranged to directly contact and support the battery plates; and a means within the tank for maintaining said battery plates in a spaced relationship and for aligning said battery plates with said notches, said means engaging at least one of said guide means in said end walls and a plurality of battery plates adapted to be placed in said tank and supported by said guide means and said identical contact bars, said battery plates each having at least two integral abutment means in direct contact with said sloping notches of said contact bars.

4. The structure defined in claim 3 wherein said guide means is a plurality of grooves in said side walls and said means within the tank for maintaining said battery plates in a spaced relationship is a pair of interchangeable channel members having a plurality of ribs which are in alignment with the crest of said notches and guiding the battery plates into wedging contact with said notches.

References Cited in the file of this patent

UNITED STATES PATENTS

| | | |
|---|---|---|
| 956,919 | Wright | May 3, 1910 |
| 1,329,556 | Stalley | Feb. 3, 1920 |
| 1,348,000 | Fleming | July 27, 1920 |
| 1,378,461 | Hubbell | May 17, 1921 |
| 2,443,112 | Morin | June 8, 1948 |
| 2,518,527 | Daily | Aug. 15, 1950 |
| 2,528,266 | Daily et al. | Oct. 31, 1950 |
| 2,594,714 | Andre | Apr. 29, 1952 |